3,769,438
READY-TO-EAT CEREAL AND COATING
COMPOSITION
David T. Rusch and Matthew J. Lynch, Wilmington, Del.,
assignors to ICI America Inc., Wilmington, Del.
No Drawing. Filed Apr. 26, 1971, Ser. No. 137,691
Int. Cl. A23l 1/18
U.S. Cl. 426—99   7 Claims

ABSTRACT OF THE DISCLOSURE

Snacks and cereals having a rich apparent mouthfeel as well as satisfactory bowl-life are produced by incorporating a hexitol such as sorbitol or mannitol with a fat-containing coating composition such that the weight ratio of hexitol/fat ranges between .03 to 2.

This invention relates to ready-to-eat cereals and snacks having fat-containing sugar coatings.

Cereals and snacks may have a relatively low density and be extremely porous as exemplified by puffed cereals, or they may comprise cereal doughs with relatively high density such as corn flakes. Normally when eaten with milk, these materials absorb liquids rapidly and become mushy. However, if they are coated with a mixture of ingredients comprising sucrose, fat, water, coloring, flavors, salt, spices, and other ingredients, they remain dry and crispy in liquids such as milk for a larger period of time. When these coatings contain a hexitol and fat, they yield a product having a rich apparent mouthfeel as well as an extended bowl-life, that is, the length of time a snack remains crisp while immersed in milk.

It is an object of the present invention to provide cereals and snacks having a rich mouthfeel as well as a satisfactory bowl-life.

Another object is to provide an aqueous syrup which is useful in producing coated snacks having a rich mouthfeel and a satisfactory bowl-life.

These objects are attained by combining a hexitol such as sorbitol, mannitol, or mixtures thereof with a fat-containing syrup such that the weight ratio of hexitol to fat in the coating ranges between .03 and 2.

The use of hexitols in products intended for human consumption is well known in pharmaceutical syrups, toothpastes, tableting bases, tableting coatings, chewing gum dusting powders, diluents for baby foods, dietetic candies, etc. A typical tablet coating composition containing sugar and mannitol is demonstrated in U.S. 3,421,920. The cereals coated in the present invention are those of the conventional ready-to-eat breakfast cereal type such as puffed wheat, puffed rice, puffed corn, or shaped particles of dough composed of corn, wheat, rice, or mixtures thereof.

The invention is usually practiced by first preparing an aqueous solution of a hexitol such as mannitol, sorbitol, or mixtures of the two; however, any method which incorporates the hexitol into the mix is suitable. Incorporation of these materials is hastened by heating the mixture to about 120° F. Into this heated mixture are added sugars or sweeteners of various types, salt, flavors, and in some cases emulsifiers, and finally fat. Usually the mixture is heated to a temperature of 180° F. to form a free-flowing syrup.

The coating is applied as an aqueous syrup (10 to 25% water) to the snack in conventional coating pans such as a Stokes Model 29-Z by allowing a hot syrup to flow over the tumbling snack particles. The tumbling is permitted to continue for periods of about 10 minutes until the surface of each particle becomes more or less uniformly covered. The coated particles are then removed from the pan and are dried in conventional means such as a forced-air drying oven for a time sufficient to reduce the water content of the final product to a range of 1.5–4% by weight based on the total particle weight. The coating on the dry particle ranges between 25 to 75% but more frequently in the range of 40 to 60% by weight of the total.

The composition of the coating on the dry particle can be about 0.5 to 15% hexitol, 5 to 20% fat, with a hexitol/fat weight ratio of .03 to 2, and preferably .1 to 1, with the remainder being sweeteners, flavors, salt, seasonings, coloring agent, etc. The coating syrup used in preparing the coated particle has hexitol/fat in the same weight ratio but differs in water content.

The hexitol used in the invention is preferably sorbitol, dulcitol, and especially mannitol, and mixtures thereof.

The fat material can be an edible fat or oil of natural origin which may if desired be a partially or completely hydrogenated product resulting from oils of coconut, soya, cottonseed, corn, etc., and fats such as tallow, or blends of these.

Sweetening agents and sugars other than sucrose may be used such as dextrose, fructose, unrefined sugars such as brown sugar, maple syrup, honey, and artificial sweeteners such as saccharin, etc.

Various seasonings in addition to salt may be useful as well as artificial flavorings and colors.

The following examples are working illustrations of, but are in no way intended to limit, the present invention:

EXAMPLE 1

To 171 grams of distilled water add 10 grams of mannitol. Heat to about 120° F. and stir until mannitol is dissolved and thereafter add 620 grams of sucrose, 45 grams brown sugar, 14 grams of salt, and heat to 180° F. with stirring. To this add 70 grams of 76° coconut oil and mix well for 10 minutes.

Load 200 grams of expanded base into a Stokes Model 29-Z coating pan. With pan running, slowly add 186 grams of hot syrup into the tumbling cereal base. Allow the cereal base and syrup to continue to tumble for an additional 10 minutes while breaking up "twins."

Place the dry coated cereal into a forced-air oven heated to a temperature of 25° F. to drive the moisture content of the final product down to 2 to 2½%.

EXAMPLE 2

Into 171 grams of distilled water add 30 grams of mannitol and heat to about 120° F. with stirring until completely dissolved. Add 600 grams sucrose, 45 grams brown sugar, 14 grams salt, and heat to 180° F. with stirring. Into this hot syrup place 70 grams 76° coconut oil and mix well for 10 minutes at 180° F. Coat 200 grams of cereal base as described in Example 1.

EXAMPLE 3

Into 163 grams of distilled water add 30 grams mannitol and 28.5 grams sorbitol solution (SORBO® 70% aqueous solution) (wt. ratio mannitol/sorbitol=3/2). Heat to about 120° F. and stir until mannitol is dissolved completely and thereafter add 580 grams sucrose, 45 grams brown sugar, 14 grams salt, and heat to 180° F. with stirring. Into the heated syrup add 70 grams of 76° coconut oil and mix for 10 minutes at 180° F. 200 grams of cereal base is coated with the hot syrup as described in Example 1.

The above three coated cereals were judged by a taste panel to be equivalent in mouthfeel to coating compositions having twice as much fat and no hexitol.

The bowl-life test was determined by placing 20 grams of the coated cereal in a 400 ml. beaker and thereafter adding 160 grams of cold whole milk. The samples were occasionally mixed lightly but thoroughly with a spatula. Crispness was determined at specific intervals by squeezing the cereal between the fingers. In each case the above compositions provided a bowl-life of at least 5 minutes.

What is claimed is:

1. A coated read-to-eat cereal snack having a satisfactory bowl-life and rich apparent mouthfeel, said coating comprising .5 to 15% by weight mannitol or mixtures of sorbitol and mannitol wherein said ratio of mannitol to sorbintol is at least 3/2, 5 to 20% by weight of an edible fat, wherein the weight ratio of said mannitol or said mannitol-sorbintol mix to said fat is in the range of .03–2.

2. A snack of claim 1 wherein said mannitol or mannitol-sorbitol mix/fat ratio is .1–1.

3. A snack of claim 1 wherein the coating contains 6% by weight mannitol and wherein said weight ratio of said mannitol or said mannitol-sorbitol mix to said fat is .6.

4. A snack of claim 1 wherein said mannitol-sorbitol mix contains 3 parts by weight mannitol and 2 parts by weight sorbitol.

5. A snack coating syrup comprising mannitol or mixtures of sorbitol and mannitol wherein said weight ratio of mannitol to sorbitol is at least 3/2 and edible fat wherein the weight ratio of said mannitol or mixture of mannitol and sorbitol to said fat is in the range of .03–2.

6. A snack coating syrup of claim 5 wherein said mannitol-sorbitol is a mixture of sorbitol and mannitol consisting of 3 parts by weight mannitol and 2 parts by weight sorbitol.

7. A snack coating syrup of claim 5 wherein the weight ratio of said mannitol or mannitol-sorbitol mix to said fat is in the range of .1 to 1.

References Cited

UNITED STATES PATENTS

| | | | |
|---|---|---|---|
| 3,484,250 | 12/1969 | Vollink et al. | 99—83 |
| 3,505,078 | 4/1970 | Hreschak | 99—83 |
| 3,477,858 | 11/1969 | Wells et al. | 99—126 |
| 3,671,266 | 6/1972 | Cooper et al. | 99—126 |

OTHER REFERENCES

"Atlas Sorbitol," Copyright 1947 by Atlas Powder Co., Wilmington 99, Del., pp. 16 and 17.

Baird; Chemical Industries, Inc., N.Y., pp. 2 and 3.

RAYMOND N. JONES, Primary Examiner

U.S. Cl. X.R.

426—199; 126—208

PO-1050
(5/69)

UNITED STATES PATENT OFFICE
CERTIFICATE OF CORRECTION

Patent No. 3,769,438                    Dated October 30, 1973

Inventor(s)  David T. Rusch and Matthew J. Lynch

It is certified that error appears in the above-identified patent and that said Letters Patent are hereby corrected as shown below:

Column 1, line 14, "as well as satisfactory" should read
--as well as a satisfactory--.

Column 2, line 43, "25°F." should read --250°F.--.

Column 3, line 6 in Claim 1, "read-to-eat" should
read --ready-to-eat--.

Column 3, line 10 in Claim 1, "sorbintol" should
read --sorbitol--.

Column 3, line 12 in Claim 1, "mannitol-sorbintol"
should read --mannitol-sorbitol--.

Signed and sealed this 3rd day of December 1974.

(SEAL)
Attest:

McCOY M. GIBSON JR.                C. MARSHALL DANN
Attesting Officer                  Commissioner of Patents